US012567699B2

(12) United States Patent
Burns et al.

(10) Patent No.: US 12,567,699 B2
(45) Date of Patent: Mar. 3, 2026

(54) EV CHARGING STATION WITH HEATED CHARGE COUPLER CRADLE

(71) Applicant: GM GLOBAL TECHNOLOGY OPERATIONS LLC, Detroit, MI (US)

(72) Inventors: Denise A. Burns, Lake Orion, MI (US); Brandon R. Jones, White Lake Township, MI (US); Kodjo M. Lee, Superior Township, MI (US); Michael E. Pedigo, Howell, MI (US); Nathan C. Adams, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 848 days.

(21) Appl. No.: 17/939,252

(22) Filed: Sep. 7, 2022

(65) Prior Publication Data

US 2024/0079818 A1 Mar. 7, 2024

(51) Int. Cl.
H01R 13/533 (2006.01)
B60L 53/16 (2019.01)

(52) U.S. Cl.
CPC ............ H01R 13/533 (2013.01); B60L 53/16 (2019.02); H01R 2201/26 (2013.01)

(58) Field of Classification Search
CPC .... H01R 13/533; H01R 2201/26; B60L 53/16
USPC ....................................... 320/120
See application file for complete search history.

(56) References Cited

U.S. PATENT DOCUMENTS

| | | | | |
|---|---|---|---|---|
| 8,933,594 B2 * | 1/2015 | Kurs | ..................... | B60L 53/665 320/108 |
| 2014/0266017 A1 * | 9/2014 | Hamada | ................ | H02M 7/003 320/107 |
| 2023/0234455 A1 * | 7/2023 | Nasr | ..................... | B60L 58/26 320/108 |

FOREIGN PATENT DOCUMENTS

| | | | |
|---|---|---|---|
| CN | 205846411 | * | 12/2016 |
| CN | 110861524 A | | 3/2020 |
| DE | 102017112390 A1 | | 12/2021 |
| DE | 102021102258 A1 | | 8/2022 |

* cited by examiner

*Primary Examiner* — Suresh Memula
(74) *Attorney, Agent, or Firm* — Quinn IP Law

(57) ABSTRACT

An electric vehicle supply equipment (EVSE) charging station for charging a propulsion battery pack of an electric vehicle (EV) includes a charging cabinet, an electrical cable, a charge coupler, and a cradle operable for stowing the charge coupler. The charging station provides a charging voltage or current to the battery pack during a charging operation of the EV. The electrical cable has a distal end connected to the charging cabinet. The charge coupler is connected to a proximal end of the electrical cable and connects to a charge receptacle of the EV. The cradle includes at least one heating element connected thereto. The heating element is configured to selectively heat the cradle body in response to the environmental state of the cradle body being indicative of accumulated snow or ice on the charge coupler and/or the cradle body.

20 Claims, 4 Drawing Sheets

EV CHARGING STATION WITH HEATED CHARGE COUPLER CRADLE

INTRODUCTION

Electrochemical battery packs serve as onboard power supplies in a myriad of mobile and stationary battery electric systems. Aboard an electric vehicle (EV), for example, a high-voltage propulsion battery pack may be arranged on a direct current (DC) voltage bus. The battery pack is constructed from an application-suitable number of battery cells, with modern EV battery cells typically having a lithium-ion, nickel-metal hydride, or nickel-cadmium chemistry. The DC voltage bus and connected battery pack ultimately power one or more electric traction motors and associated power electronic components during battery discharging modes. The constituent battery cells of the battery pack are then periodically recharged by an offboard electric vehicle supply equipment (EVSE) charging station when the EV is idle, or via regenerative braking during vehicle operation.

In a typical battery charging process, a charge receptacle located on a body of the EV is connected to the EVSE charging station via a charge plug or coupler, e.g., a J1772, CHAdeMO, CCS, or other multi-pin AC or DC charge coupler. Depending on the relevant charging standard, the battery pack may undergo an AC-based charging process using standard household voltages (AC Level 1), e.g., 110-120V, or AC Level 2 chargers enable faster charging times relative to those achievable via AC Level 1 using a higher voltage, for instance a 208V-240V charging outlet. DC fast charging (DCFC) in contrast provides the fastest possible charging times by delivering a DC voltage and charging current directly to the propulsion battery pack, i.e., without the need for AC-to-DC power conversion.

SUMMARY

Disclosed herein are systems and methods for selectively heating a charge coupler holster or cradle of an offboard electric vehicle supply equipment (EVSE) charging station. A charging station is typically located outside, and is thus exposed to prevailing weather conditions. During cold winter months or inclement weather, snow and ice may accumulate on the charge coupler and cradle. At times the accumulated snow and ice could become lodged in a plug end of the charge coupler, which in turn could interfere with proper connection of the charging pins of the charge coupler and a mating charge receptacle of an electric vehicle (EV). The present solutions are therefore directed toward heating the cradle, e.g., when the charge coupler is stowed therein and thus not otherwise in use or while the charge coupler s being used to perform a charging operation. Heating of the cradle in this manner helps melt the accumulated snow and ice during or prior to charging operations, and to prevent such interference. Another attendant benefit of the present teachings is the added comfort afforded to a user when initially grasping a prewarmed handle of the charge coupler in cold weather conditions, with the charge coupler indirectly warmed by the cradle.

In accordance with an aspect of the disclosure, an EVSE charging station for charging a propulsion battery pack of an EV includes a charging cabinet having the above-noted heatable cradle, an electrical cable, and a charge coupler. The cradle configured to receive the charge coupler when the charge coupler is stowed. The cradle in a possible embodiment includes at least one heating element connected to the cradle, e.g., embedded therewithin, and configured to selectively heat a body of the cradle ("cradle body") in response to an environmental state of the cradle being indicative of possible accumulated snow or ice on the charge coupler. The state of the cradle is thus used as a proxy for the state of the charge coupler located in proximity to the cradle.

In one or more embodiments, the heating element may include a resistive heating element such as a metal coil or segment of wire. Alternatively, the cradle may include a coolant loop operable for circulating a heated coolant through the cradle body and possibly the charge coupler, in which case the heating element includes the heated coolant flowing through the cradle.

Aspects of the disclosure include a sensor operable for detecting the environmental state of the cradle. The sensor may include a temperature sensor, in which case the environmental state of the cradle may include a measured temperature of the cradle. Other implementations of the sensor include a humidity sensor, in which case the environmental state of the cradle may include a relative humidity level of the cradle, e.g., within a cavity of the cradle or in close proximity of the cradle body.

The charge coupler includes a plurality of charging pins. The heating element in one or more embodiments includes the heating element being positioned proximate the charging pins when the charge coupler is securely nested or holstered within the cradle cavity.

Also disclosed herein is a cradle for use with an EVSE charging station. The cradle in accordance with the disclosure may include a cradle body forming or defining the above-noted cradle cavity, with the cradle cavity in turn being configured to receive the charge coupler therein when the charge coupler is not in use. As part of this embodiment, a sensor is operable for detecting an environmental state of the cradle. At least one heating element is connected to the cradle within the cradle cavity and is configured to selectively heat the cradle, and thus the charge coupler nested therein. Such heating occurs in response to the environmental state of the cradle being indicative of accumulated snow or ice on the charge coupler.

In another aspect of the disclosure, a method for use with the EVSE charging station includes determining the environmental state of the cradle via a controller of the charging station using one or more sensors, and selectively activating at least one heating element connected to the cradle in response to the environmental state being indicative of accumulated snow or ice on the charge coupler.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

Figure 1:
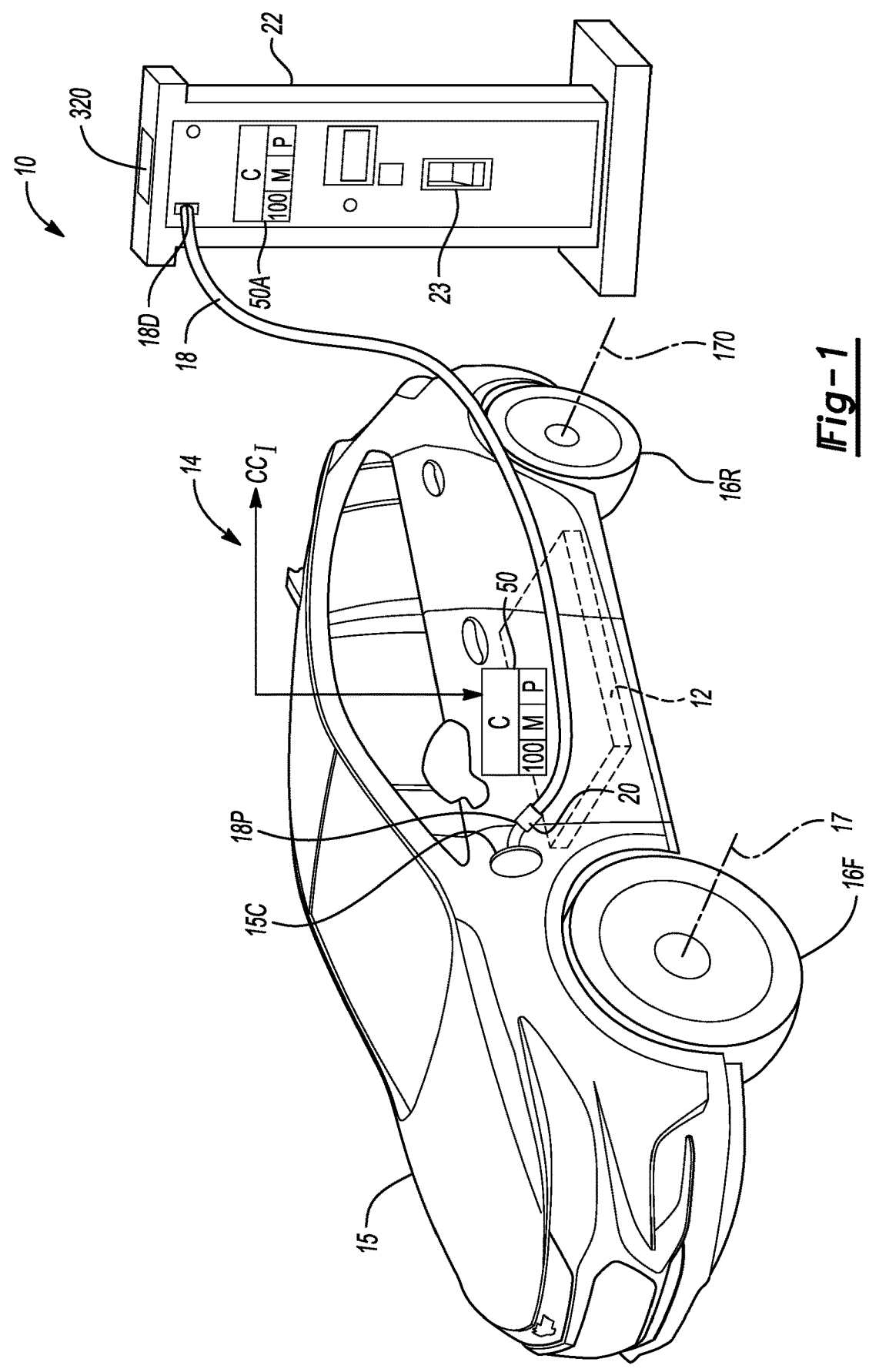
FIG. 1 is an exemplary electric vehicle (EV) undergoing a charging process at an electric vehicle supply equipment (EVSE) charging station equipped with a heatable cradle in accordance with an aspect of the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation". Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Referring to the drawings, wherein like reference numbers refer to like features throughout the several views, FIG. 1 depicts an electric vehicle supply equipment (EVSE) charging station 10 for charging a propulsion battery pack 12 of an electric vehicle (EV) 14. For instance, the EV 14 may be embodied as a battery electric motor vehicle, with the present teachings also being extendable to plug-in hybrid electric vehicles. The solutions described herein may be extended to other electrified mobile systems such as but not limited to rail vehicles, aircraft, marine vessels, robots, farm equipment, etc. Therefore, the EV 14 of FIG. 1 is intended to be illustrative of just one possible electrified system within the scope of the disclosure and not limiting thereof.

The exemplary EV 14 shown in FIG. 1 includes a vehicle body 15 and road wheels 16F and 16R, with "F" and "R" indicating the respective front and rear positions. The road wheels 16F and 16R rotate about respective axes 17 and 170, with the road wheels 16F and/or the road wheels 16R being powered by output torque from a rotary electric machine (not shown) of the EV 14, as appreciated in the art. Such an electric machine may be embodied as a polyphase/alternating current (AC) traction motor energized by the propulsion battery pack 12 and a power inverter (not shown). As appreciated by those skilled in the art, a power inverter is typically configured with control circuits including power transistors, e.g., IGBTs for transforming high-voltage DC electric power to high-voltage AC electric power, and transforming high-voltage AC electric power to high-voltage DC electric power. Although omitted for illustrative simplicity, such components and other components, e.g., an accessory power module/DC-DC-converter, onboard charging module, and other power electronics may be included in the overall structure of the EV 14.

During charging of the propulsion battery pack 12, a charge receptacle 15C of the EV 14 is connected to the EVSE charging station 10 via a charge coupler 20 and an electrical cable 18. A charging cabinet 22 of the EVSE charging station 10, which includes a cradle 23 operable for receiving therein the charge coupler 20 when the latter is not in use, is operable for providing a charging voltage or current to the propulsion battery pack 12 via the electrical cable 18. Heatable embodiments of the cradle 23 are set forth below with reference to FIGS. 2 and 3, with an exemplary method 100 for heating the cradle 23 provided in FIG. 4.

To that end, the electrical cable 18 of FIG. 1 has a distal end 18D connected to the charging cabinet 22, i.e., to the charging equipment contained therein, and a proximal end 18P that is connected to the charge coupler 20. The charge coupler 20 in turn is configured to connect to a mating charge receptacle of the EV 14 as appreciated in the art, e.g., a five-pin J1772 receptacle, or alternatively a CHAdeMO, CCS, or another application-suitable AC or DC receptacle. In the example of J1772, those skilled in the art will appreciate that the charge receptacle is equipped with corresponding receptacles for Line 1, Line 2/Neutral, Proximity/Pilot (12V), Control/Pilot (12V), and Ground, with the charge coupler 20 having corresponding pins for mating up with such receptacles.

Still referring to FIG. 1, the EV 14 and the EVSE charging station 10 may include a corresponding electronic control unit or controller (C) 50 or 50A, respectively, for regulating the charging operation. To that end, input signals (arrow CCI) may be actively communicated or passively detected in different embodiments, such that the controllers 50, 50A are operable for determining a particular state of charge of the propulsion battery pack 12, an available charging voltage from the charging station 10, etc. The charging cabinet 22 may be connected to or in communication with sensor(s) 320 as described below with reference to FIG. 4 for detecting or receiving information descriptive of prevailing weather conditions in the area of the charging station 10.

The controllers 50 and 50A as contemplated herein are equipped with one or more processors (P), e.g., logic circuits, combinational logic circuit(s), Application Specific Integrated Circuit(s) (ASIC), electronic circuit(s), central processing unit(s), semiconductor IC devices, etc., as well as input/output (I/O) circuit(s), appropriate signal conditioning and buffer circuitry, and other components such as a high-speed clock to provide the described functionality. The controllers 50 and 50A may include an associated computer-readable storage medium, i.e., non-transitory memory (M) inclusive of read only, programmable read only, random access, a hard drive, etc., whether resident, remote or a combination of both. Control routines are executed by the processor to monitor relevant inputs from sensing devices and other networked control modules (not shown), and to execute control and diagnostic routines to govern operation of the EV 14 and the EVSE charging station 10. The controller 50A in particular is also programmed to perform the method 100.

Figure 2:
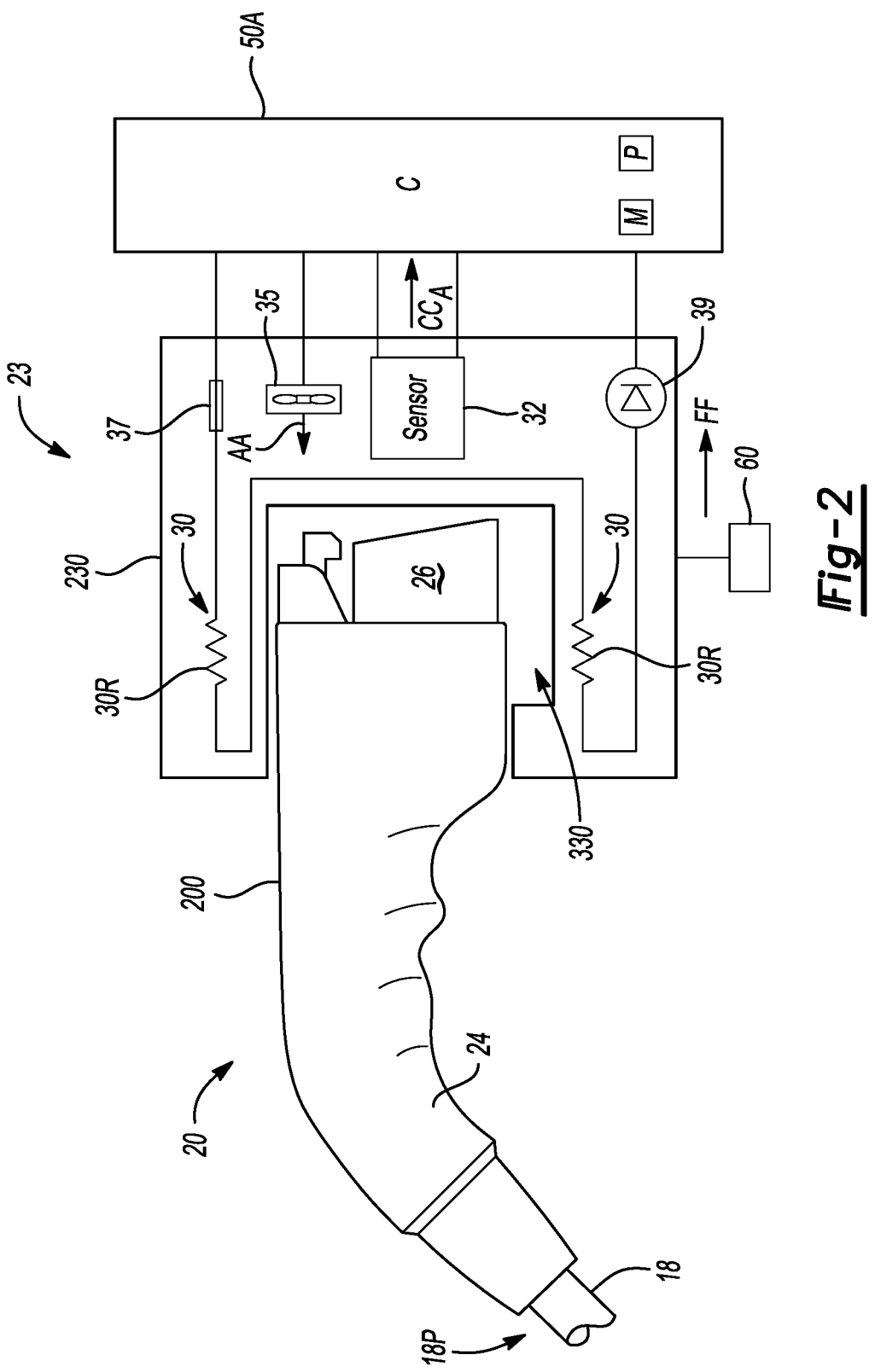
FIG. 2 illustrates a cradle according to an exemplary embodiment.

Referring now to FIG. 2, the charge coupler 20 according to a possible embodiment includes a coupler body 200 having a handle 24 and a plug end 26. The plug end 26 includes a plurality of conductive contacts or pins (not shown), e.g., the five J1772 pins described above or another number or configuration of pins when the charge coupler 20 is of different charging standard. The handle 24, which is connected to the electrical cable 18 at the distal end 18D thereof, is configured to be grasped by a user of the EV 14 of FIG. 1 during the charging process until the plug end 26 is securely connected to the charge receptacle 15C of FIG. 1.

Within the scope of the disclosure, at least one heating element 30 is connected to or embedded within a cradle body 230 of the cradle 23 and configured to selectively heat the cradle body 230 in response to one or more activation signals (arrow CCA). More specifically, the heating element 30 is configured to selectively heat the cradle body 230 in response to the environmental state of the cradle 23 being indicative of accumulated snow or ice on the charge coupler 20 and/or the cradle 23.

Figure 3:
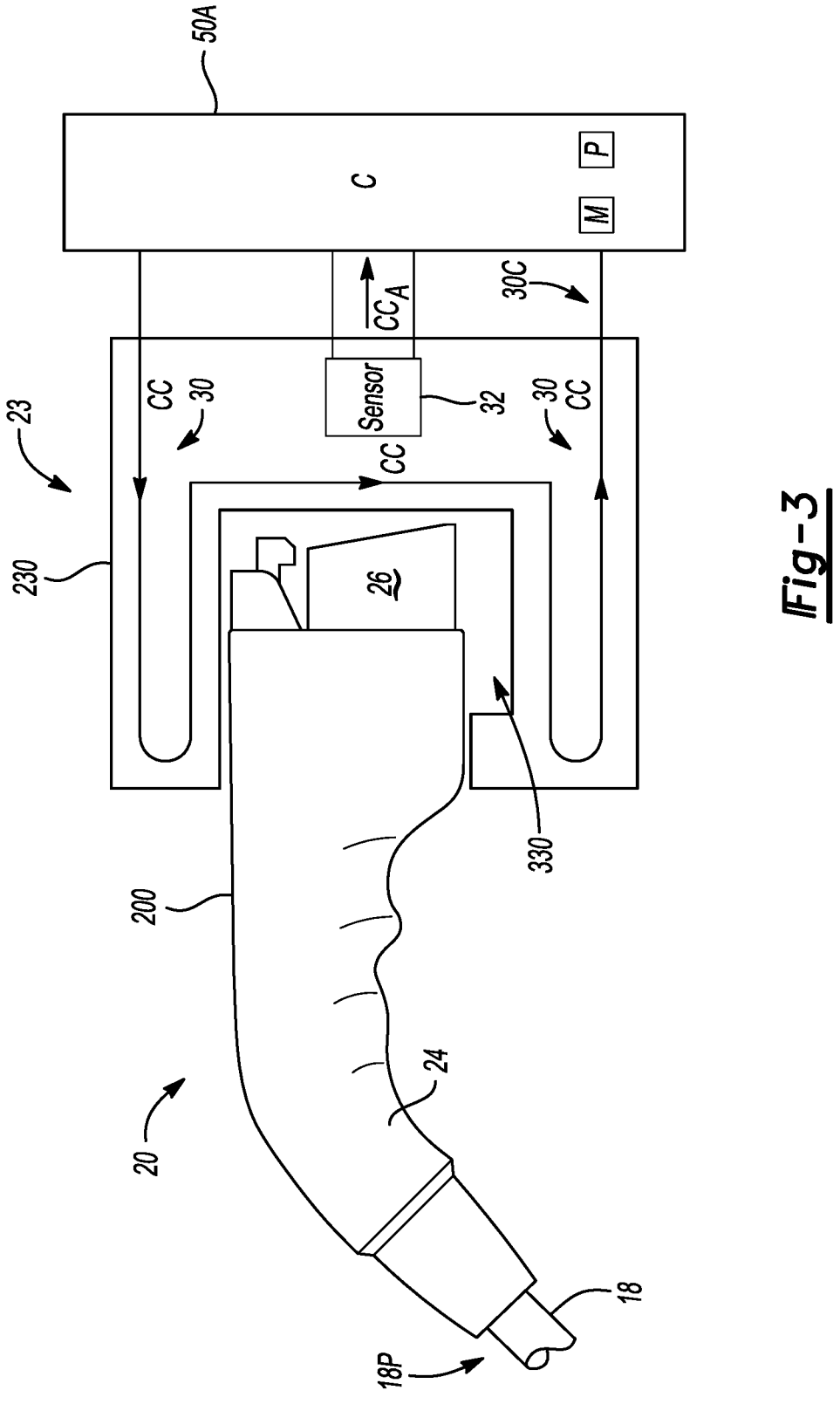
FIG. 3 illustrates an alternative embodiment to the cradle shown in FIG. 2.

In a possible embodiment, the heating element 30 may include at least one resistive heating element 30R, which in turn may be connected in series with a fuse 37 and an optional indicator device 39, e.g., an LED indicating that the heating element 30 is currently being energized or activated. Other options may include infrared or radiant heating. Alternatively, the EVSE charging station 10 may include a coolant loop 30C as shown in FIG. 3 operable for circulating heated coolant (arrows CC) through the cradle body 230, and possibly through the charging cabinet 22 of FIG. 1, the electrical cable 18, and the charge coupler 20. The heating element 30 in this instance may include the heated coolant (arrows CC) of FIG. 3 flowing through tubing or other fluid conduit (not shown) forming the coolant loop 30C.

Yet another embodiment is depicted in FIG. 2 in which a motorized fan or blower 35 directs warm air (arrow AA) from the charging cabinet 22 (see FIG. 1) into a cradle cavity 330 and onto the charge coupler 20 when nested therewithin to help heat the cradle body 230 and charge coupler 20. In still other embodiments, an actuator 60 could be used to retract the cradle body 230 into the warmer, enclosed, and thus relatively protected environment of the charging cabinet 22 of FIG. 1. For example, upon stowing the charge coupler 20 in the cradle 23, the controller 50A may command the actuator 60 to translate the cradle body 230 a predetermined distance into an internal volume of the charging cabinet 22, as indicated by arrow FF in FIG. 2. Various linear actuators or rotary actuators could be envisioned for this purpose, e.g., a motorized ball screw device, as appreciated in the art.

Operation of the EVSE charging station 10 of FIG. 1 in one or more embodiments may rely on readings or measurements from a sensor 32 operable for detecting an environmental state of the cradle 23, and thus the charge coupler 20 nested therewithin or in proximity thereto. In a possible implementation, the sensor(s) 32 of FIG. 2 may include a temperature sensor, in which case the environmental state may include a temperature of the cradle 23, e.g., of the cradle body 230, such as in proximity to charging pins when the charge coupler 20 is nested in the cradle cavity 330. In another embodiment, the sensor(s) 32 may include a humidity sensor, in which case the environmental state may include a relative humidity level of the cradle body 230 or the cradle cavity 330.

As appreciated by those skilled in the art, the charge coupler 20 of relevant industry-standard charging infrastructure includes a plurality of the charging pins (not shown) located within the plug end 26. Thus, the heating element 30 may include a heating element 30 positioned proximate the charging pins when the charge coupler 20 rests within the cradle cavity 330. The at least one heating element 30 may also include a heating element 30, shown as a resistive heating element 30R in this non-limiting embodiment, which is positioned within or connected to the cradle 23 and operable for warming the cradle body 230.

Figure 4:
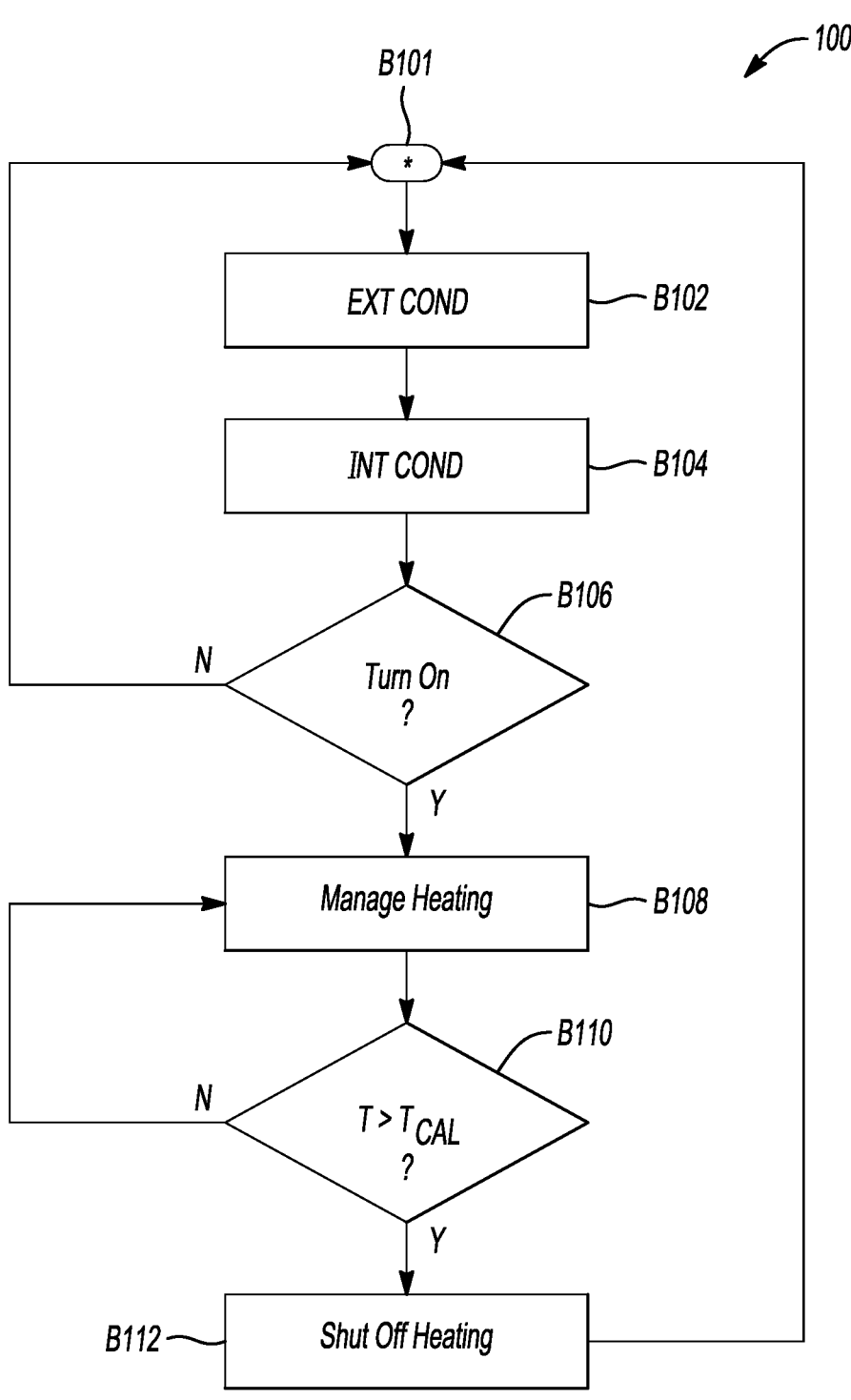
FIG. 4 is a flow chart describing an exemplary method for heating the cradle of the EVSE charging station depicted in FIG. 1.

Referring to FIG. 4, instructions embodying the present method 100 may be recorded on a tangible, non-transitory computer-readable storage medium, e.g., the memory (M) described above, and executed by the processor (P) of the controller 50A shown in FIG. 1. An exemplary embodiment of the method 100 commences at block B101 ("*") with initialization of the controller 50A, which could occur periodically or at regularly scheduled intervals to ensure that related buffers are cleared and temporary memory is refreshed. The method 100 then proceeds to block B102.

At block B102, the controller 50A may determine the current external environmental state. For instance, the sensor(s) 320 of FIG. 1 could be mounted to the charging cabinet 22 or a nearby structure and configured to measure the current external environmental conditions, such as ambient temperature, barometric pressure, relative humidity, wind speeds, etc., in the general vicinity of the charging station 10. Likewise, the charging cabinet 22 could be connected to the internet or another information source to monitor weather conditions. As the charging station 10 is likely to be located outside and thus exposed at times to rain, sleet, ice, and snow, block B102 effectively evaluates whether local weather conditions favor an accumulation of ice or snow on exposed surfaces of the charge coupler 20 illustrated in FIG. 2. The method 100 proceeds to block B104 after the current external environmental state has been determined.

Block B104 entails determining a current internal environmental state using the sensor(s) 32 of FIG. 2. For example, a temperature sensor embodiment of the sensor 32 may measure and report an internal temperature of the cradle 23 or cradle body 230, and/or the sensor 32 embodied as a humidity sensor may measure relative humidity levels within or near the cradle 23 or cradle body 230. Blocks B102 and B104 together effectively evaluate whether local and internal environmental conditions favor an accumulation of ice or snow on exposed surfaces of the charge coupler 20 and/or cradle 23 illustrated in FIGS. 2 and 3. The method 100 proceeds to block B106 upon completion of block B104.

At block B106, the processor (P) of the EVSE charging station 10 determines if the prevailing weather conditions warrant activation of the heating element(s) 30 of FIG. 2 or 3. Such a determination could entail comparing the measured values from blocks B102 and B104 to corresponding thresholds recorded in memory (M) of the controller 50A depicted in FIG. 1. As an example, a multi-dimensional lookup table populated with binary decision values of 0 and 1, or "ON" and "OFF", could be accessed by local/external and internal readings from blocks B102 and B104, with the processor (P) of controller 50A referencing such a table to select the corresponding decision value. The method 100 may return to block B101 if conditions do not call for activation of the heating element(s) 30. The method 100 instead proceeds to block B108 if conditions warrant activation of the heating element(s) 30.

At block B108, the controller 50A of FIG. 1 manages heating based on the current status of the EVSE charging station 10. In a possible implementation, the processor (P) of the controller 50A could determine whether the charge coupler 20 is presently stowed in the cradle 23 (standby event) or connected to the EV 14 of FIG. 1 (charging event). In a possible approach, the two events could have different heating profiles, perhaps with a sustained lower-temperature heating provided in standby and a temporarily elevated temperature provided during charging, or vice versa. Likewise, changing weather conditions could cause the processor (P) to modify the heating profile in real time, such as by increasing heating during a snow or ice storm.

A possible implementation of the method 100 could therefore entail determining, via the controller 50A, whether the charge coupler 20 is presently stowed in the cradle 23 of the charging station 10, for instance via a pressure, proximity, or contact switch (not shown), or is instead connected to the EV 14. The method 100 would thereafter include executing a first heating profile when the charge coupler 20 is presently stowed in the cradle 23 of the charging station 10, and executing a second heating profile when the charge coupler 20 is connected to the EV 14 of FIG. 1. The method 100 then proceeds to block B110.

Block B110 includes determining, via the controller 50A, whether the internal temperature of the cradle 23 of FIGS. 1 and 2 has reached a threshold internal temperature level. Other values such as humidity could be used in other embodiments. Such a threshold is a maximum permissible temperature/humidity level for the particular standby or charging event of block B108, and thus block B110 may entail performing a simple comparative process, e.g., using a comparator circuit. The method 100 proceeds to block B112 when the internal temperature and/or humidity of the cradle 23 has reached the noted threshold internal temperature and/or humidity, and instead returns to block B108 when the internal temperature and/or humidity remains below the threshold.

Block B112 of FIG. 4 includes shutting off the heating element(s) 30. This action may entail a complete cessation of heating functions, e.g., by opening a switch (not shown) to cut off electric supply to the resistive heating elements 30R of FIG. 2, activating a valve (not shown) to stop a flow of heated coolant CC (FIG. 3) through the cradle 23, etc. Alternatively, block B112 could involve lowering the level of heating to maintain the internal temperature of the cradle body 230, such as by reducing current flow through the resistive heating element 30R or reducing flow of the heated coolant CC instead of completely stopping the flow. The method 100 then returns to block B101 and repeats the above-described process.

As will be appreciated by those skilled in the art in view of the foregoing disclosure, the present teachings provide a myriad of benefits to users of the EVSE charging station 10 shown in FIG. 1 in locations that are subject to cold weather conditions. In addition to allowing the user to comfortably grasp the handle 24 of the charge coupler 20 during the charging process due to the indirect warming of the charge coupler 20 by the heated cradle 23, inclusion of the heating element(s) 30 of FIG. 2 within the cradle 23, combined with intelligent weather-based activation decisions of the controller 50A, provide various other benefits.

For instance, the present teachings would help prevent the accumulation of snow and ice on surfaces of the cradle 23 prior to and during use. Such an accumulation would be of particular concern at the plug end 26 of FIGS. 2 and 3 due to possible interference with the mating contact connection to the EV 14 when connecting or disconnecting the charge coupler 20. As the controller 50A decides when to activate the heating element(s) 30, whether or alone or in conjunction with communication with the controller 50 located aboard the EV 14 shown in FIG. 1, the use of the heating element(s) 30 remains selective. For instance, periods of warm weather or direct sunlight may not require use of the heating element(s) 30, thereby allowing the described heating feature to be turned off to conserve energy. These and other attendant benefits will be readily appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A charging station for charging a propulsion battery pack of an electric vehicle (EV), comprising:
a charging cabinet operable for providing a charging voltage or current to the propulsion battery pack during a charging operation of the EV, the charging cabinet having a cradle comprising a cradle body and at least one heating element embedded within the cradle body;
an electrical cable having a distal end and a proximal end, wherein the distal end is connected to the charging cabinet; and
a charge coupler connected to the proximal end of the electrical cable and configured to connect to a charge receptacle of the EV, the charge coupler being stowable in the cradle cavity when the charge coupler is not in use, wherein the at least one heating element is configured to selectively heat the cradle body in response to the environmental state of the cradle body being indicative of accumulated snow or ice on the charge coupler and/or the cradle body.

2. The charging station of claim 1, wherein the at least one heating element includes a resistive heating element.

3. The charging station of claim 1, further comprising:
a coolant loop operable for circulating a heated coolant through the cradle body, wherein the heating element includes the heated coolant.

4. The charging station of claim 1, further comprising:
a sensor operable for detecting the environmental state of the cradle body.

5. The charging station of claim 4, wherein the sensor includes a temperature sensor and the environmental state of the charge coupler includes a temperature of the cradle body.

6. The charging station of claim 4, wherein the sensor includes a humidity sensor and the environmental state of the cradle body includes a humidity level of the cradle body.

7. The charging station of claim 1, wherein the charge coupler includes a plug end, and wherein the at least one heating element includes one or more heating elements positioned proximate the plug end when the charge coupler is stowed in the cradle.

8. A method for use with a charging station for charging a propulsion battery pack of an electric vehicle (EV), the charging station having a charge coupler, a charging cabinet having a cradle for stowing the charge coupler when the charge coupler is not in use, and an electrical cable connecting the charge coupler to the charging cabinet, the method comprising:

determining an environmental state of the cradle via a controller of the charging station using one or more sensors; and selectively activating at least one heating element embedded within the cradle in response to the environmental state being indicative of accumulated snow or ice on the charge coupler and/or the cradle body.

9. The method of claim 8, wherein the one or more sensors are connected to the cradle body and include a temperature sensor, and wherein determining the environmental state of the cradle body includes measuring a temperature of the cradle body using the temperature sensor.

10. The method of claim 9, further comprising:

shutting off the at least one heating element in response to the temperature of the cradle body having reached a threshold temperature level.

11. The method of claim 8, further comprising:

comparing the environmental state of the cradle body to a corresponding threshold value, wherein selectively activating the at least one heating element occurs when the environmental state exceeds the corresponding threshold value.

12. The method of claim 8, wherein the at least one heating element includes a resistive heating element, and wherein selectively activating the at least one heating element includes selectively energizing the resistive heating element with an electric current.

13. The method of claim 8, wherein the charging station includes a coolant loop operable for circulating a heated coolant through the cradle body, wherein the at least one heating element includes the heated coolant, and wherein selectively activating the heating element includes selectively circulating the heated coolant through the cradle body.

14. The method of claim 8, wherein the one or more sensors include a humidity sensor, and wherein determining the environmental state of the cradle body includes using the humidity sensor to measure a humidity level within or around the cradle body.

15. The method of claim 8, further comprising:

determining, via the controller, whether the charge coupler is presently stowed in the cradle or connected to the EV;

executing a first heating profile when the charge coupler is presently stowed in the cradle; and executing a second heating profile when the charge coupler is connected to the EV.

16. A cradle for a charging station, the cradle comprising:

a cradle body defining a cradle cavity operable for stowing therein a plug end of a charge coupler of the charging station when the charge coupler is not in use;

a sensor operable for detecting an environmental state of the cradle body; and at least one heating element embedded within the cradle body, wherein the at least one heating element is configured to selectively heat the cradle body in response to the environmental state of the cradle body being indicative of accumulated snow or ice on the charge coupler and/or the cradle body.

17. The cradle of claim 16, wherein the at least one heating element includes a resistive heating element.

18. The cradle of claim 16, further comprising:

a motorized blower operable for directing heat from the charging cabinet into the cradle cavity.

19. The cradle of claim 16, further comprising:

a coolant loop operable for circulating a heated coolant through the cradle body, wherein the at least one heating element includes the heated coolant.

20. The charge coupler of claim 16, wherein the at least one heating element includes a first heating element positioned proximate the plug end of the charge coupler when the charge coupler is stowed in the cradle cavity.

* * * * *